United States Patent
Perng et al.

(10) Patent No.: US 7,720,785 B2
(45) Date of Patent: *May 18, 2010

(54) SYSTEM AND METHOD OF MINING TIME-CHANGING DATA STREAMS USING A DYNAMIC RULE CLASSIFIER HAVING LOW GRANULARITY

(75) Inventors: Chang-shing Perng, Goldens Bridge, NY (US); Haixun Wang, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/121,942

(22) Filed: May 16, 2008

(65) Prior Publication Data
US 2008/0222060 A1 Sep. 11, 2008

Related U.S. Application Data

(63) Continuation of application No. 11/379,692, filed on Apr. 21, 2006, now abandoned.

(51) Int. Cl.
*G06N 5/02* (2006.01)
(52) U.S. Cl. ..................................................... 706/47
(58) Field of Classification Search .................... 706/47
See application file for complete search history.

(56) References Cited

U.S. PATENT DOCUMENTS

| 5,864,839 | A  | 1/1999 | Bourgoin |
| 6,571,225 | B1 | 5/2003 | Oles et al. |
| 6,741,556 | B1 | 5/2004 | Seddigh et al. |
| 2002/0046198 | A1 | 4/2002 | Hitt |
| 2003/0135603 | A1 | 7/2003 | Lin |
| 2004/0139059 | A1 | 7/2004 | Conroy et al. |
| 2005/0060295 | A1 | 3/2005 | Gould et al. |
| 2006/0020600 | A1 | 1/2006 | Corl, Jr. et al. |

FOREIGN PATENT DOCUMENTS

| WO | 2003091905 A3 | 11/2003 |
| WO | 2004068288 A3 | 8/2004 |

(Continued)

OTHER PUBLICATIONS

Daniel Kifer, Shai Ben-David, and Johannes Gehrke "Detecting Change in Data Streams" Department of Computer Science, COrnell University. Proceedings of the 30$^{th}$ VLDB conference, 2004.*

(Continued)

*Primary Examiner*—David R Vincent
*Assistant Examiner*—Ben M Rifkin
(74) *Attorney, Agent, or Firm*—Cantor Colburn LLP; Lou Percello

(57) ABSTRACT

A dynamic rule classifier for mining a data stream includes at least one window for viewing data contained in the data stream and a set of rules for mining the data. Rules are added and the set of rules are updated by algorithms when an drift in a concept within the data occurs, causing unacceptable drops in classification accuracy. The dynamic rule classifier is also implemented as a method and a computer program product.

16 Claims, 9 Drawing Sheets

FOREIGN PATENT DOCUMENTS

WO  2005017813 A3  2/2005

OTHER PUBLICATIONS

Frans Coenen and Paul Leng. "An Evaluation of Approaches to Classification Rule Selection" Proceedings for the Fourth IEEE International Conference on Data Mining (ICDM'04) 2004 p. 1-4.

Dong, et al. "Efficient Mining of Emerging Patterns: Discovering Trends and Differences". SIGKDD 1999. pp. 43-52.

Ganti, et al. "A Framework for Measuring Changes in Data Characteristics". PODS 1999. 12 pages.

Domingos, et al. "Mining High-Speed Data Streams" SIGKDD 200. pp. 71-80.

Babcock, et al. "Models and Issues in Data Stream Systems". PODS 1999. pp. 1-30.

Gehrke, et al. "On Computing Correlated Aggregates Over Continual Data Streams". SIGMOD 2001. 12 pages.

Dong, et al. "Online Mining of Changes from Data Streams: Research Problems and Preliminary Results". ACM SIGMOD MPDS 2003. 3 pages.

Dong, et al. "Online Mining of Changes from Data Streams: Research Problems and Preliminary Results". Power Point Presentation slides from the University at Buffalo, The State University of New York. pp. 1-15.

Chen, et al. "Multi-Dimensional Regression Analysis of Time-Series Data Streams". Proceedings of the 28th VLDB Conference, Hong Kong, China, 2002. 12 pages.

Wang, et al, "Mining Concept-Drifting Data Streams Using Ensemble Classifiers". SIGKDD 2003. 10 pages.

Wang, et al. "System and method of mining time-changing data streams using models of low granularity". IBM T.J. Watson Research Center, U.S.A. Feb. 23, 2006. pp. 1-11.

Hulten, et al. "Mining-Time-Changing Data Streams". 10 pages.

* cited by examiner

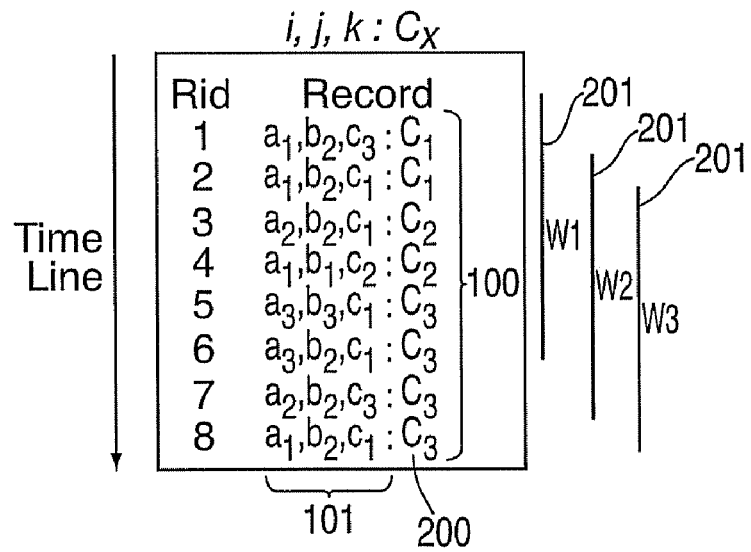
FIG. 5
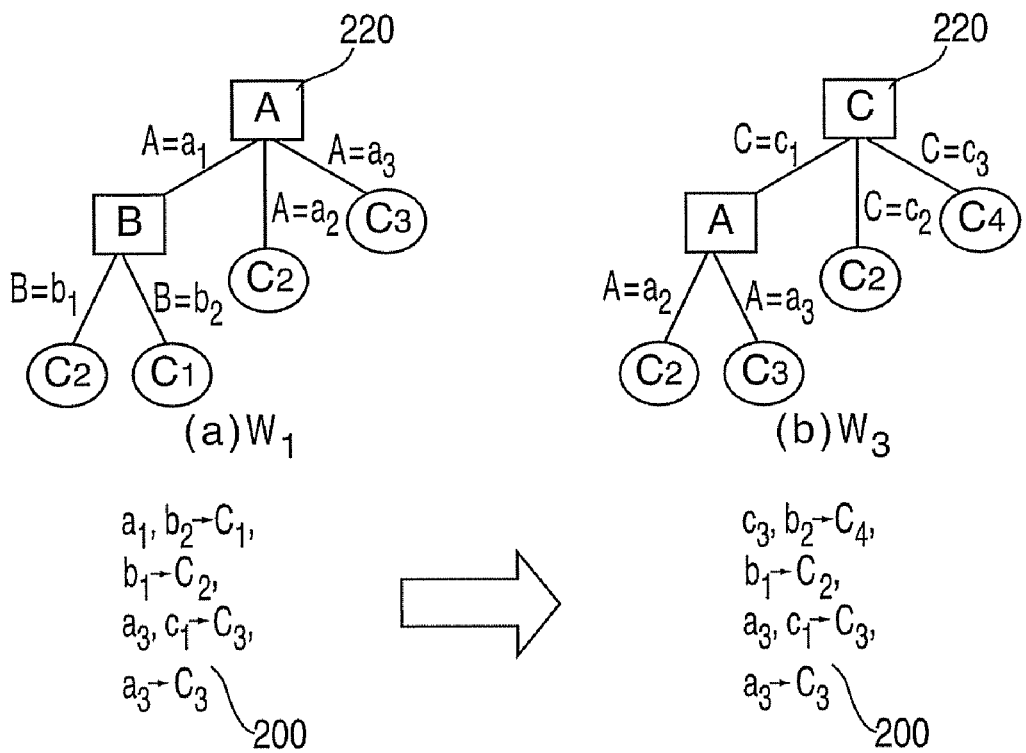
FIG. 6A
PRIOR ART
FIG. 6B
PRIOR ART

SYSTEM AND METHOD OF MINING TIME-CHANGING DATA STREAMS USING A DYNAMIC RULE CLASSIFIER HAVING LOW GRANULARITY

CROSS REFERENCE TO RELATED APPLICATION

This application is a continuation application of U.S. Ser. No. 11/379,692, filed Apr. 21, 2006, the contents of which are incorporated by reference herein in their entirety.

BACKGROUND OF THE INVENTION

The advent of new computing technologies such as ubiquitous computing, e-commerce, and sensor networks has lead to intensive research on manipulation and use of data from data streams. Although a great deal of information may be gleaned from a data stream, making accurate predictions from the data stream is of particular interest to many users. Traditional methods for searching data streams for particular data (also referred to as "data mining") have involved the use of algorithms that are tailored to specific aspects of data within the data stream. Unfortunately, with the advancement of data complexity, complications have arisen when applying such traditional methods.

A pervasive challenge with mining a data stream involves the changeable nature of the data. That is, typically, a data stream changes over time exhibiting what is commonly referred to as "concept drift." Reference may be had to the publications "Mining time-changing data streams" Hulten, G., Spencer, L., and Domingos, P., SIGKDD, ACM Press, San Francisco, Calif., 2001, pp-97-106 and "Mining concept-drifting data streams using ensemble classifiers" Wang, H. SIGKDD, ACM Press, San Francisco, Calif., 2003.

If the nature of the data distribution is static, a subset of the data can be used to create (i.e., learn) a model and use it for all future data. Unfortunately, when the data distribution is constantly changing, the model is quickly outmoded. This means static models must constantly be revised to reflect the current data features. It is not difficult to see why model update incurs a major cost in terms of analyses and time, and typically require complex and comprehensive coding. Models for classifying data streams (referred to as "stream classifiers") that handle concept drifts can be roughly divided into two categories.

A first category of stream classifiers is known as "incrementally updated classifiers." One exemplary type of incremental classifier, referred to as using a "CVFDT" approach, uses a single decision tree to model streams with concept drifts. Reference may again be had to the publication "Mining time-changing data streams" Hulten, G., Spencer, L., and Domingos, P., SIGKDD, ACM Press, San Francisco, Calif., 2001, pp-97-106. However, in this approach, even a slight drift of the concept may trigger substantial changes in the tree (e.g., replacing old branches with new branches, re-growing or building alternative sub-trees), which severely compromises learning efficiency. Aside from this undesirable aspect, incremental methods are also hindered by their prediction accuracy. For example, incremental classifiers discard older examples (input data used for model building) at a fixed rate (without regard for any change of the concepts). Thus, the learned model is supported only by the data in a current window—a relatively small amount of data from the data stream. The inherent flaws in incremental classifiers cause large variances in data prediction. Reference may also be had to FIG. 1 and FIG. 2 that depict aspects of challenges encountered when attempting to fit a model using incrementally updated classifiers to a data stream.

In FIG. 1 and FIG. 2, a data stream 100 that includes a series of records 101 is mined by a model using incremental classifiers. Relevant data 110 is defined by a line, depicting an optimum boundary. As can be seen, particularly with regard to FIG. 2, the definition of relevant data provided by the model can easily misclassify data.

A second category of stream classifiers is known as "ensemble classifiers." Instead of maintaining a single model, the ensemble approach divides the data stream into data chunks having a fixed size and learns a classifier from each of the chunks. Reference may again be had to the publication "Mining concept-drifting data streams using ensemble classifiers" Wang, H. SIGKDD, ACM Press, San Francisco, Calif., 2003. In order to use ensemble classifies to make a prediction, the model used must evaluate all of the classifiers in the ensemble, which is an expensive process. The ensemble approach has high model update cost as i) new models on new data are constantly being learned, whether or not the data contains concept drifts; and, ii) the accuracy of older models are constantly evaluated by applying each of them to new training data. Further, the classifiers are homogeneous and therefore discarded as a whole. This approach introduces a considerable cost in modeling of high-speed data streams. If timely updating of models is not completed because of the high update cost, prediction accuracy drops as a result. This causes problems in data predictions, particularly for applications that handle large volume streaming data at very high speeds. Aspects of data mining using the ensemble approach are depicted in FIG. 3 and FIG. 4.

In FIG. 3 and FIG. 4, the data stream 100 is portioned into fixed size chunks of data 102. The chunks of data 102 are mined by a model using an ensemble of classifiers. Instances of relevant data 110 (identified by the shading in the depiction of the chunks of data 102) are collected. Classification error, depicted in FIG. 4, comes at a high cost to the data mining.

Current approaches for classifying stream data are adapted from algorithms designed for static data, for which monolithic models typically perform adequately. However, dynamic data streams present problems for developing meaningful predictions. For incrementally updated classifiers, the fact that even a small disturbance in the data may bring a complete change to the model indicates that monolithic models are not appropriate for data streams. The ensemble is not semantic-aware. That is, in the face of concept drifts, it is still very costly to tell which components are affected and hence must be replaced, and what new components must be brought in to represent the new concept. What is needed is a model for mining data streams that accounts for drifting concepts within the data and is a computationally low-cost model.

Typically, data mining involves a large volume of data produced at a high-speed. Multiple data streams may be involved, so classification plays an important role in filtering out irrelevant information. Data mining competes with other processing elements for resources (CPU, memory, etc, . . . ). Thus, flexible and efficient data mining systems are needed. New models for mining data streams are increasingly important as traditional classification methods work on static data, and usually require multiple scans of training data in order to build a model.

BRIEF SUMMARY OF INVENTION

Disclosed is a dynamic rule classifier for classifying data from a data stream that includes at least one drifting concept, the dynamic rule classifier including: a window for viewing a plurality of records of the data stream; a plurality of rules wherein each rule is derived from the plurality of records appearing in the window; at least one data tree for maintaining the plurality of rules; and, an engine for evaluating the plurality of records against the plurality of rules, detecting a concept drift in the data stream, invoking at least one algorithm for deriving at least one new rule and updating the plurality of rules.

Further disclosed is a method using a dynamic rule classifier for mining data from a data stream having at least one drifting concept, the method including: detecting the at least one drifting concept by performing quality estimation; and, deriving new components for the dynamic rule classifier when quality is below a threshold.

Also disclosed is a method for classifying data from a data stream on an ongoing basis, the data stream comprising at least one drifting concept, the method including: viewing a plurality of records of the data stream appearing in a window; deriving from the plurality of records appearing in the window a plurality of rules; classifying data in the plurality of records according to the plurality of rules; comparing a first classification of the data to a second classification of the data to detect a concept drift; and, upon detecting the concept drift; deriving at least one new rule to account for the concept drift and updating the plurality of rules.

Further still, disclosed is a computer program product stored on machine readable media, the product for classifying data from a data stream on an ongoing basis, the data stream having at least one drifting concept, and including instructions for: viewing a plurality of records of the data stream appearing in a window; deriving from the plurality of records appearing in the window a plurality of rules; classifying data in the plurality of records according to the plurality of rules; comparing a first classification of the data to a second classification of the data to detect a concept drift; and, upon detecting the concept drift; deriving at least one new rule to account for the concept drift and updating the plurality of rules.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 depicts aspects of streaming data for data mining;

FIG. 6A and FIG. 6B, collectively referred to herein as FIG. 6, data mining for streaming data using a model having low granularity;

Figure 1:
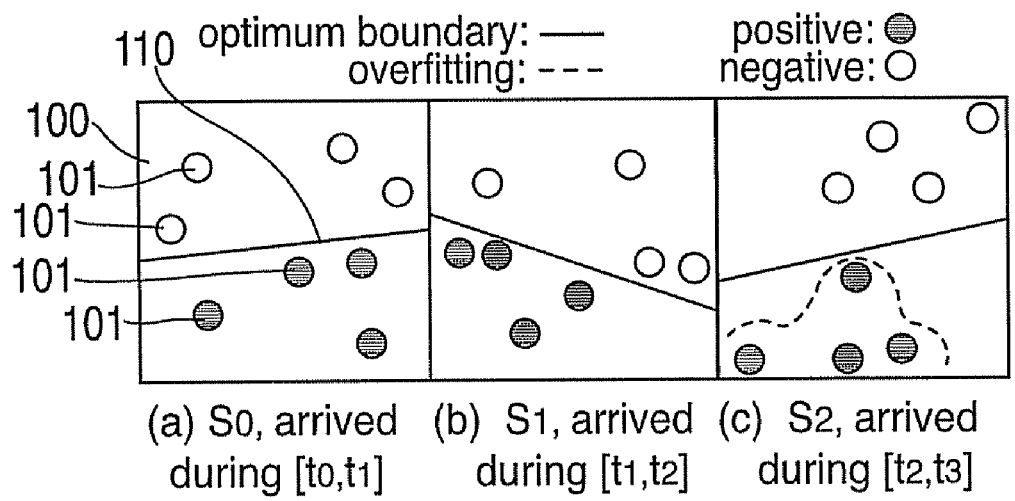
FIG. 1 and FIG. 2 depict aspects of prior art incrementally updated classifiers.
Figure 2:
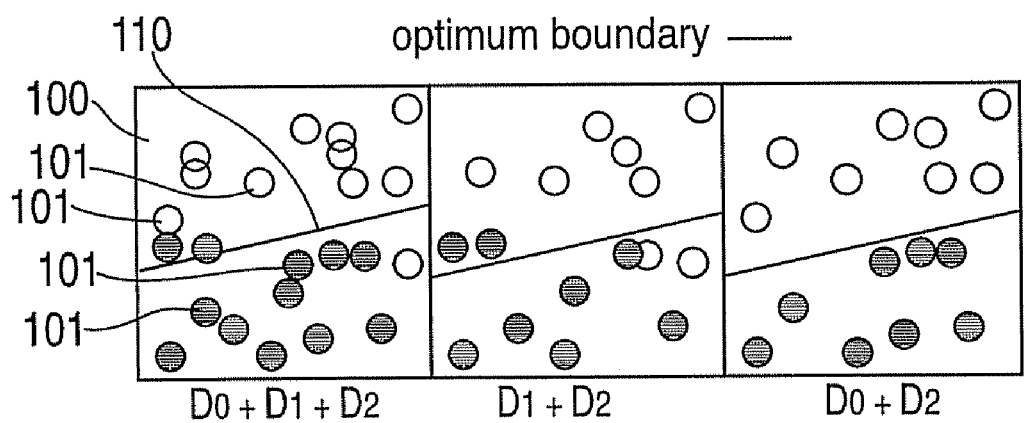
Figure 3:
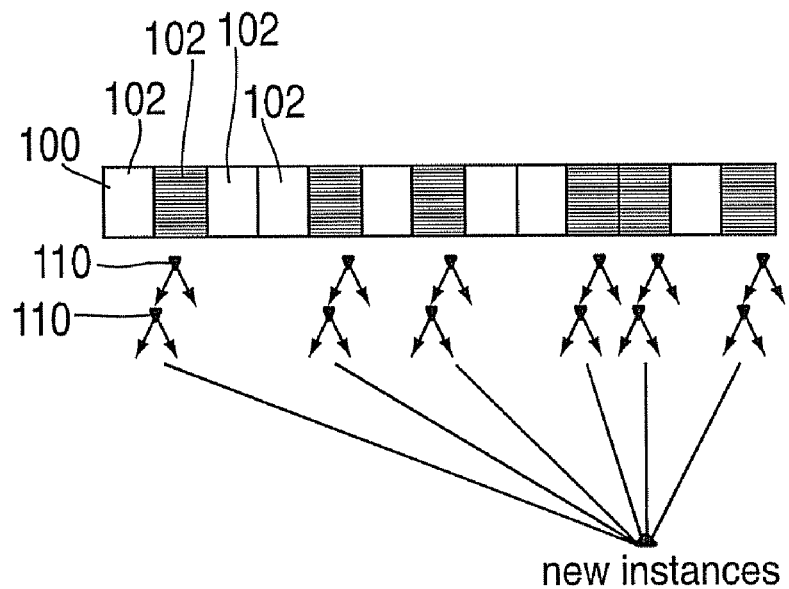
FIG. 3 depicts aspects of prior art ensemble classifiers.
Figure 4:
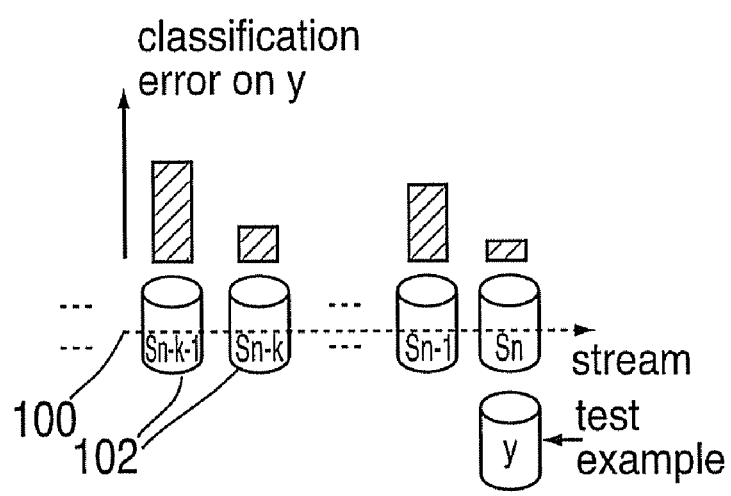
FIG. 4 depicts aspects of prior art classification errors.

The detailed description explains the preferred embodiments of the invention, together with advantages and features, by way of example and with reference to the drawings.

DETAILED DESCRIPTION OF THE INVENTION

Disclosed herein are a system and a method for mining time changing data streams. The system and method make use of a model (also referred to as a "dynamic rule classifier") having low granularity. The dynamic rule classifier is substantially lower in cost over prior art classifiers. Typically, and as used herein, cost is a measure of at least a computational efficiency in terms of speed and accuracy for updating of a classifier and is related to size of the classifier.

As used herein, the terms "model" and "classifier" are generally interchangeable. These terms generally make reference to systems and techniques for mining data. The "dynamic rule classifier" of the present invention provides for certain advantages over the prior art. However, it should be noted that the terms "model" and "classifier" are considered generic and may be properly used in regard to the dynamic rule classifier.

It is considered that prior art techniques for mining dynamic data streams incur a significant model update cost because such techniques typically use static models that do not provide for semantic decomposition. That is, prior art models are typically tailored to certain aspects of the data stream. Although a single model or an aggregation of models may be used to mine the data stream, the models are relatively static (or "monolithic"). That is, the prior art models generally do not adapt to changes in the character of data within the data stream, and can be considered to exhibit a higher degree of "granularity" (i.e., specificity) that is typically desired.

With regard to the teachings herein, it is important to note certain aspects of streaming data. In most applications, concepts within the streaming data evolve slowly and exhibit "concept drift." That is, subtle changes in the concepts provided within the data typically occur and may drift with the streaming of the data. In such cases, updating the dynamic rule classifier used for searching for concepts (also referred to as "data mining") typically does not require making global changes to account for the concept drift.

Although the term "semantic" is used herein to generally connote aspects of content within the data stream, semantics are not limited to certain forms of data (such as alphanumeric presentations) or the content of the data. Rather, the term "semantics" generally makes reference to any type and any form of data presented for data mining.

The dynamic rule classifier disclosed herein provides semantic-aware components having fine granularity. That is, when the dynamic rule classifier encounters concept drift in one or more aspects of the data stream, the dynamic rule classifier provides an efficient technique for determining a) which components are affected by the concept drift, and b) what new components should be introduced to account for concept drift (or completely new concepts, for that matter) without affecting other aspects of the dynamic rule classifier. It is considered that granularity plays an important role in determining update cost. For example, a low-granularity model generally does not provide monolithic performance when mining data, is typically responsive to many concepts and typically adapts to concept drift.

For data streams that exhibit concept drift, model updates are desired to maintain efficient data mining. A design for a model that can be updated easily and efficiently should take the following properties into account:

1. The model should be decomposable into smaller components where each component can be revised independently of other components;

2. The decomposition should be semantic-aware so that when concept drift occurs, there is an efficient way to identify which component of the model is no longer relevant for the data stream, and to identify aspects of a new component to be built.

One skilled in the art can readily understand that incrementally updated classifiers (i.e., the CVFDT approach) do not meet either of the two properties, while ensemble classifiers (EC) satisfy only the first property.

The teachings herein provide for reducing the cost of model updates by reducing the granularity of the model. In order to provide further context for these teachings, examples are now provided. First, prior art decision tree classifiers are used to illustrate the impact of model granularity on update cost. Then, aspects of the dynamic rule classifier are discussed to illustrate beneficial aspects thereof.

First, and in reference to FIG. 5, aspects of an exemplary embodiment of the data stream 100 are depicted. In FIG. 5, the data stream 100 includes a sequence of records $r_1, \ldots, r_k, \ldots$, where each record 101 has d attributes $A_1, \ldots, A_d$. In addition, each record $r_n$ is associated with a class label 200, denoted as $C_i$. Each record $r_k$ is also identified by a record identifier (k), or record id.

Aspects of the dynamic rule classifier are also depicted. FIG. 5 also depicts three windows 201 ($W_1$, $W_2$, $W_3$) each having a size of six records that correlate to the data stream 100. Each record r 101 is described three attributes (denoted as $a_i$, $b_j$, and $c_k$) and one class label C 200.

In regard to the teachings herein, a current window is denoted as $W_i$. The current window $W_i$ views records $r_i, \ldots, r_{i+w-1}$, where w represents the size of the current window $W_i$. The class label $C_i$ is learned from the current window $W_i$. In this example, the data stream 100 includes training data (however, this is non-limiting and any type of data could be used).

Referring now to FIG. 6, a prior art decision tree 220 is used to illustrate the cost of updating a classifier. The decision tree 220 presents an "interpretable" model, that is, unlike a black box, the semantics of the decision tree 220 provides for incremental update to the model.

A decision tree 220 for the window $W_1$ is shown in FIG. 6A. After the arrival of record $r_7$ and $r_8$, the window $W_1$ moves to window $W_3$. A decision tree 220 for $W_3$ is shown in FIG. 6B.

It should be noted that as used herein, the term "moving window" and other such terms relate to examination of a certain number of records $r_k$ within the data stream 100 with the dynamic rule classifier. Such terms are somewhat arbitrary and should be liberally construed. That is, it should be recognized that the data stream 100 may be considered movable. Therefore, it should be recognized that "movement" as discussed or implied generally relates to the advancement of data. In short, it is considered that the subscripts associated with the certain variables presented herein are descriptive of aspects of the model, data mining, and updating of the various structures, while "movement" is merely a descriptive term to aid in an understanding of the teachings presented.

Typically, a majority of the data in the data stream 100 (and the concepts embodied therein remain static), it can be seen that the decision tree 220 in FIG. 6A is substantially different from the decision tree 220 of FIG. 6B. This difference illustrates that small concept drift in the data stream 100 may warrant large (global) changes to monolithic classifiers. Thus, even for an interpretable model, in many cases, incrementally maintaining the classifier is as costly as rebuilding the classifier.

The ensemble approach uses multiple classifiers. However, the multiple classifiers are usually homogeneous, each classifier is designed for a specific global data feature. In this sense, each classifier in the ensemble approach is still monolithic, and is usually replaced as a whole when accuracy drops below an acceptable level.

Turning now to aspects of the dynamic rule classifier, it is typical that a rule has the form of $p_1 \hat{\ } p_2 \hat{\ } \ldots \hat{\ } p_k \rightarrow C_j$, where $C_j$ is the class label 200, and each $p_i$ is a predicate in the form of $A_i = v$. The rule $p_1 \hat{\ } p_2 \hat{\ } \ldots \hat{\ } p_k$ may also be denoted as a pattern. Each rule is learned from the records $r_k$ in the current window $W_i$. Quantities are typically defined to provide for validation of each rule. For example, if a support statistic (or "parameter") and confidence statistic are above a predefined threshold (e.g., set as minsup and minconf, respectively) the rule may be deemed to be a valid rule. Each valid rule is learned from current window $W_i$ to form a classifier $C_i$ 200. Refer again to the data shown in FIG. 5.

Assume the minsup statistic and the minconf statistic are set at 0.3 and 0.8 respectively. The valid rules for the window $W_1$ are:

$$a_1,b_2 \rightarrow C_1, b_1 \rightarrow C_2, a_3, c_1 \rightarrow C_3, a_3 \rightarrow C_3 \qquad (1)$$

After the current window $W_i$ moves from $W_1$ to $W_3$, the valid rules become:

$$c_3,b_2 \rightarrow C_4, b_1 \rightarrow C_2, a_3, c_1 \rightarrow C_3, a_3 \rightarrow C_3 \qquad (2).$$

From Eq. (1) and Eq. (2), the following observations may be made: i) only the first rule has changed and shows that some concept drift in the data stream 100 does not necessarily call for an update to the overall dynamic rule classifier (only $C_1$ has been replaced); ii) the dynamic rule classifier exhibits low granularity, because each component, whether a rule, a pattern, or a predicate, is interpretable and replaceable.

Thus, as long as the majority of the data remains the same between two windows, it is a goal to only slightly change certain components of the dynamic rule classifier to maintain sensitivity.

Exemplary algorithms are presented herein that provide for i) efficiently identifying components (rules) that have become outdated, and ii) efficiently deriving new components to accurately mine new or emerging concepts.

On this basis, the dynamic rule classifier is considered to be a low granularity stream classifier. The dynamic rule classifier includes a set of rules. In an exemplary illustration, $W_i$ represents the most recent window (i.e., the current window $W_i$), and $C_i$ represents the classifier 200 for the current window $W_i$. When the current window $W_i$ incrementally advances to $W_{i+1}$, the support (minsup) and the confidence (minconf) of the rules in $C_i$ are updated. A new classifier $C_{i+1}$ includes the old rules of $C_i$ that remain valid (meaning that the support statistic and the confidence statistic are above the predetermined threshold). Also included in the new classifier $C_{i+1}$ are any new rules found in $W_{i+1}$.

In order to classify an unlabelled record, the rule that has the highest confidence among all the rules and that matches the unlabelled record is used. If the unlabelled record does not match any valid rule, the record is typically classified as being a part of a majority class for the current window $W_{j+x}$.

One of the advantages of the teachings herein lies in the handling of concept drift. For example, if the concept drift is slight and the window W for the data stream 100 has an appropriate size, most rules do not change their status from valid to invalid or from invalid to valid. It should be noted that windows that are too big will build up conflicting concepts, and windows that are too small will give rise to an overfitting problem. Both problems have an adverse effect on prediction accuracy. Regardless, this approach incurs minimal learning cost.

Another advantage of the teachings herein includes an approach that detects concept drift by tracking misclassified records. The tracking is typically performed by designating a historical window for each class as a reference for accuracy comparisons. Tracking provides for efficiently identifying the components of the dynamic rule classifier that are outdated.

Further, the teachings herein provide a heuristic for deriving new rule components from the distribution of misclassified records, thus avoiding learning new rules from the raw data again.

Detecting concept drift usually begins with grouping rules by the respective class label $C_j$ 200. Then, for each class $C_j$, a historical reference window $W_k$ is designated. To detect concept drift related to class $C_i$, the predictive accuracy of rules corresponding to $C_i$ in the reference window $W_k$ is compared with the current window $W_i$. The rationale for this comparing is that when the data distribution is stable and the size of the current window $W_i$ is appropriate, the dynamic rule classifier has stable predictive accuracy. If, at a certain point, the accuracy changes considerably, it is typical that some concept drift has occurred and some new rules that represent the new concept may have emerged or are needed.

Predictive accuracy of a model is usually measured by the percentage of records 100 that the model misclassified. For instance, in the ensemble approach, a classifier is considered obsolete if use of the classifier results in a high percentage of misclassified records 100. If so, the entire classifier is discarded. Discarding the classifier in this manner does not consider which part of the classifier caused the inaccuracy. Accordingly, potentially accurate aspects of the classifier are unnecessarily discarded as well.

For the dynamic rule classifier, instead of using a percentage of misclassified records as a measure of performance, a distribution of the misclassified records is examined. More specifically, each record r is considered to have been misclassified if i) the classifier assigns a wrong label to the record r, or ii) there is no matching rule for the record r. Furthermore, each record r can be considered as a misclassified record r that belongs to the class $C_j$ if a true label for the record r is $C_j$.

Figure 7:
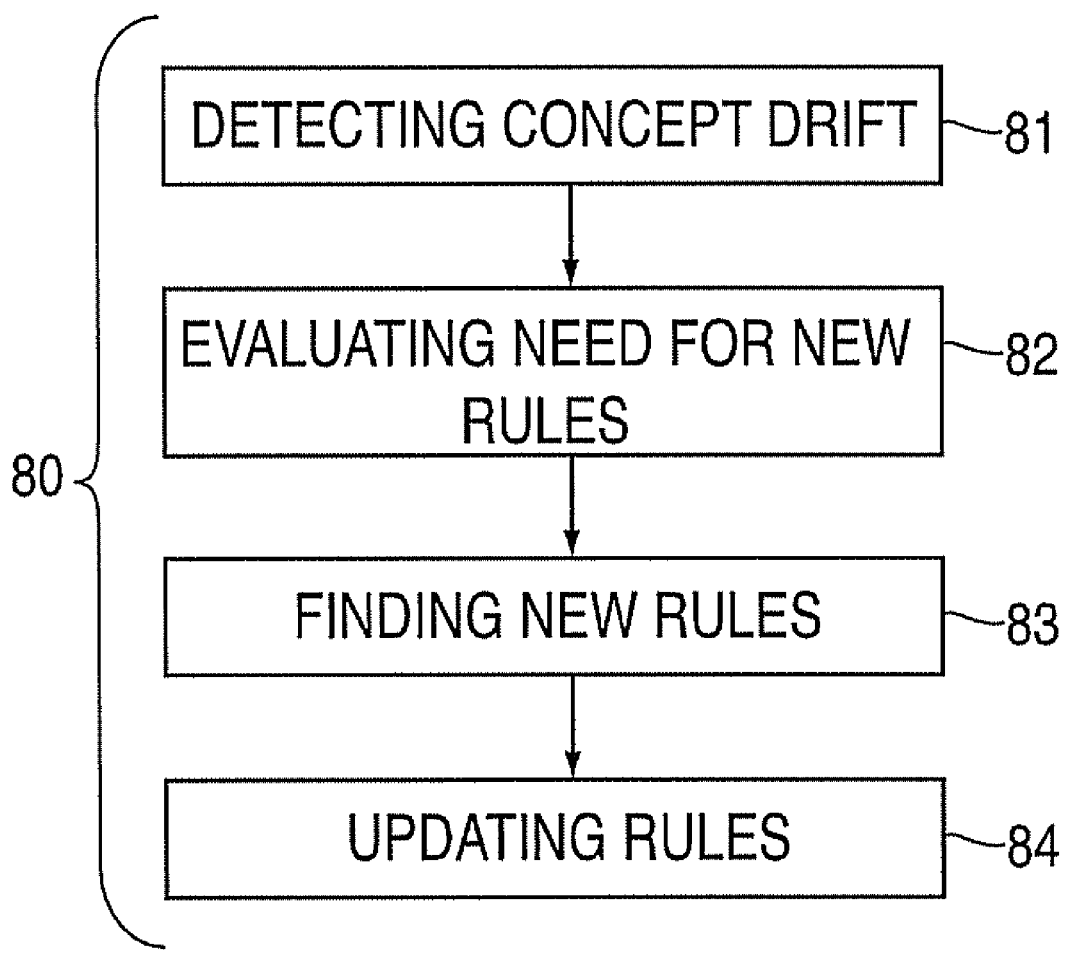
FIG. 7 depicts aspects of operation of the model having low granularity.

A method for operation of the low granularity model as the dynamic rule classifier is provided in FIG. 7. In this non-limiting embodiment, model operation 80, involves detecting concept drift 81, evaluating a need for new rules 82, finding new rules 83 and updating the rules 84. The steps shown in FIG. 7 are non-limiting and illustrative of techniques for implementation of the dynamic rule classifier.

Detecting concept drift 81 typically calls for considering a number of misclassified records $N_{ij}$. For example, let $W_i$ refer to a current window having a fixed size $N_i$. $N_{ij}$ represents a number of records in $W_i$ whose true class is $C_j$ but that are misclassified.

Assuming that for any class $C_j$, if the data distribution is stable then the number of misclassified records $N_{ij}$ is also stable. However, if there is a concept drift related to the class $C_j$, then the accuracy of existing rules for the class $C_j$ will drop, and new rules for the class $C_j$ will emerge. The drop in accuracy is reflected in an abnormal increase in the number of misclassified records $N_{ij}$. With further analyses, the misclassified records $N_{ij}$ can be used to identify the rules within the model that are causing the inaccuracy as a result of a new data distribution. Therefore, with appropriate analyses of the misclassified records $N_{ij}$, new rules can be derived.

To measure whether an increase in the number of misclassified records $N_{ij}$ amounts to a concept drift in the current window $W_i$, a historical reference window $W_k$ is selected for use as a reference. Note that this reference window $W_k$ is typically not a fixed window. For example, if the window W immediately before the current window $W_i$ (that is, k=i−1) is always selected as the reference window $W_k$, concept drift may be undetectable. As concept drift usually evolves relatively slowly, use of a reference window $W_k$ that is only incrementally different than the current window $W_i$ may not provide for adequate sensitivity for detection of concept drift. In some embodiments, random selection of an index(i) for the reference window $W_k$ is used. In these embodiments, analyses of data and window relationships not only provides for determinations regarding concept drift, but may further be useful for detection of any systematic bias or other information in the data stream 100.

Evaluating the need for new rules 82 draws upon analyses from the detecting of concept drift 81. For example, consider the current window $W_i$ and the reference window $W_k$ for class $C_j$ where the number of misclassified records $N_{kj}=\min_{1\leq i}N_{1j}$.

Clearly, for different classes $C_x$, the reference windows $W_k$ may be different. As reference window $W_k$ provides information regarding how far the concepts (with regard to a particular class $C_x$) have drifted away from the original state (in which they are accurately modeled), it can be decided whether new rules that account for concept drift need to be derived. In more specific terms, if a difference between the number of misclassified records $N_{ij}$ in the current window $W_i$ and the number of misclassified records $N_{kj}$ in the reference window $W_k$ reaches a user-defined threshold minWR, (i.e., $N_{ij}-N_{kj}\geq$minWR), it may indicate that new rules are needed for the class $C_j$ in the current window $W_i$.

In order to avoid checking each record r in the current window $W_i$ whenever the current window $W_i$ moves, an efficient technique is needed for computing the number of misclassified records $N_{ij}$ in the current window $W_i$. When the window $W_{i-1}$ becomes the current window $W_i$, the record $r_{i+w-1}$, is the record r moving into the current window $W_i$, and the record $r_{i-1}$ is the record r moving out of the current window $W_i$. Therefore, in this instance, the number of misclassified records $N_{ij}$ can be estimated as:

$$N_{ij}=N_{i-1,j}+g(r_{i+w-1},i,j)-g(r_{i-1},i,j) \qquad (3)$$

where g(r, I, j)=1 if the true label for the record r is $C_j$ and the record r is misclassified by $C_i$ as some other class $C_x$ (and 0 otherwise). Therefore, it is assumed that for any record r shared by the current window $W_i$ and the reference window $W_k$, the two classifiers $C_{i-1}$ and $C_i$ will always return the same result regarding whether a proper class for the record r is $C_j$. Because $C_{i-1}$ and $C_i$ share the same rules in regard to class $C_j$, and only differ slightly in the associated confidence and support, each estimate should typically be relatively close. However, the number of misclassified records $N_{ij}$ in the current window $W_i$ minus the number of misclassified records $N_{kj}$ in the reference window $W_k$ might not prove to be an accurate estimation if k is much smaller than i. This problem can typically be avoided by computation of the number of misclassified records $N_{ij}$ for every class $C_j$ at certain checkpoints.

Once evaluating the need for new rules 82 has concluded the finding of new rules 83 proceeds. In an exemplary embodiment, it is assumed that in the current window $W_i$, the number of misclassified records $N_{ij}-N_{kj} \geq$ minWR, where minWR represents a defined maximum tolerance value for misclassified records. This indicates new rules are needed to deal with a drop of accuracy. To begin finding new rules 83, the misclassified records $N_{ij}$ are analyzed. The analysis is conducted to find clues about the patterns for the new rules.

As an example of analyzing the misclassified records $N_{ij}$, assume all misclassified records $N_{ij}$ whose true class label is $C_j$ satisfy two predicates $A_1=v_1$ and $A_2=v_2$. It is very likely that a new rule in the form of $P \rightarrow C_j$ has emerged where P contains one or both of the two predicates $A_1, A_2$. On the other hand, if a predicate has few misclassified records, the new rules probably do not contain the predicate. This type of heuristic is used to estimate the form of the new rules based on the information in the misclassified records $N_{ij}$.

To better illustrate finding new rules 83, let $L_{ij}$ represent a set of predicates each of which is satisfied by no less than c misclassified records r that belong to class $C_j$. The set of predicates $L_{ij}$ is represented in the form of $\{p_i: c_i\}$ where $p_i$ represents a predicate, and $c_i \geq c$ represents the number of misclassified records $N_{ij}$ belonging to $C_j$ that satisfy the predicate $p_i$. The set of predicates $L_{ij}$ is used to generate candidate patterns for the new rules.

Refer again to the data stream 100 depicted in FIG. 5. In this case, assume the defined maximum tolerance value for misclassified records (minWR) is 2. For the window $W_1$, classifier $C_1$ (shown in Eq. 1) classifies every record r correctly, so $N_1$, i=0 for $1 \leq I \leq 4$. For the window $W_3$, both $r_7$ and $r_8$ are misclassified, so $N_{3;4}$ becomes 2. Since the increase of $N_{3;4}$ is $\geq$ minWR, new rules are derived for $W_3$. For class $C_4$, the misclassified predicates $p_i$ and the associated misclassified frequency are descried as $\{b_2: 2; c_3: 2; a_1: 1; a_2: 1\}$. In this case, a new rule is very likely to have a pattern that includes predicate $b_2$ and may include the predicate $c_3$. These predicates are used to generate a pattern for the new rule. Beneficially, this technique ignores other patterns. Reviewing the data stream 100, it turns out that $c_3; b_2 \rightarrow C_4$ is the new rule needed (refer to Eq. 2).

The technique for deriving new rules is now described more generally. In typical embodiments, a table T is used to store the set of predicates $L_{ij}$ for each class $C_j$. The table T is updated as the current window $W_i$ moves. In this manner, the table T always includes the misclassified predicates $p_i$ and the associated frequencies from the most recent window. When the current window $W_i$ becomes the new window W and the record $r_{i-1}$ (the record r that moves out of the current window $W_i$) is a previously misclassified record r having a true label of $C_j$, then for each attribute $A_d$, the count of $A_d=v_d$ is decreased by 1 (where $v_d$ is the value of $r_{i-1}$ for attribute $A_d$) and the table T is updated. This also occurs for the record $r_{i+w-1}$ (the record r that moves into the current window $W_i$), with an increase in the count of $A_d=v_d$ instead.

An exemplary algorithm for deriving (or "mining") the new rules is now provided. The algorithm presented provides a summary of the foregoing description for finding new rules 83.

Algorithm MINERULE
1. sort all candidate predicates $p_i$ by frequency;
2. choose the top-K predicates $p_1, \ldots, p_K$ to construct a Candidate Rule Set (CRS);
3. scan the current window $W_i$ to compute the support and confidence of rules in CRS; and,
4. add valid rules to the model.

For every w records (where w represents the size of the current window $W_i$), the number of misclassified records $N_{ij}$ in the current window $W_i$ is compared with the number of misclassified records $N_{kj}$ in the reference window $W_k$ for each j. It should be recognized that aspects of the algorithm MINERULE may employ other techniques, and that the example provided is non-limiting. For example, in step 1, candidate predicates $p_i$ may be sorted using criteria other than frequency.

Procedure MINERULE, or an equivalent thereto, is invoked to mine new rules if the difference exceeds minWR (i.e., $N_{ij}-N_{kj} \geq$ minWR). Considering MINERULE, in the first step, a set of candidate patterns is constructed. Subsequently, all predicates $p_i$ are sorted by occurrence frequency, typically in a descending order. Then, the top-K predicates $p_i$ are used to construct patterns. The patterns are typically restricted to be within a certain length Q, for a few reasons. Three reasons for restricting the length Q include i) a rule with many predicates $p_i$ has low support and cannot be used to form a valid rule, ii) complex rules tend to overfit the data, and iii) evaluating rules with a long pattern length Q is time consuming. In the second step of MINERULE, a candidate rule set (CRS) for class $C_j$ is constructed using patterns obtained. The support (sup) and the confidence (conf) of the rules in CRS are computed. If a certain candidate rule is valid, that is, the correlating value for the support and the confidence exceeds a user defined minimum value, (i.e., minsup and minconf, respectively) the new rule is added to the model.

A test of the adequacy of the new rules typically involves evaluation of the rules as the window W advances. Adjusting user-defined criteria balances a task of finding desired data with mining of noise from the data stream 100. Depending the constraints used, some subtle concept drift might go undetected. In some cases, such as operating with the constraints relaxed, more rules may derived, but return noise from the data. Regardless of how the task of mining data is balanced, any new rules will be evaluated as the window W is incrementally moved.

As a protection against improper estimation, and as previously discussed, at some window W down the data stream 100, a comparison of misclassified records $N_{ij}$ in the current window $W_i$ and misclassified records $N_{kj}$ in the reference window $W_k$ is conducted. This comparison provides further statistical information for detecting concept drift 81. In most cases, the introduction of the new rules in the current window $W_i$ will result in a reduced number of misclassified records $N_{ij}$ in the current window $W_i$, so that a difference with the misclassified records $N_{kj}$ in the reference window $W_k$ is smaller than the defined maximum tolerance value for misclassified records minWR, which means the new rules are properly tailored to the data stream 100. In cases where the difference between the misclassified records $N_{ij}$ in the current window $W_i$ and the misclassified records $N_{kj}$ in the reference window $W_k$ is still larger than the defined maximum tolerance value for misclassified records minWR (which indicates that either some rules have been missed, or that there is further concept drift), the procedure MINERULE is again invoked. Experiments show that in most cases, only one application of procedure MINERULE is needed to adequately address one concept drift.

In a typical data structure of the classifier, two tree structures are used to maintain the rules and the records r for the most recent window W (i.e., the current window $W_i$). Use of the two tree structures provides for efficiently accessing records r and updating rules for mining the data stream 100. A first data structure is referred to as an "RS-tree," while a second data structure is referred to as the "REC-tree."

Current rules are stored in the "RS-tree," which is considered a prefix tree. For example, consider that there is a total order among attributes $A_1 < \ldots A_d$. Sorts of the predicates $p_i$ and patterns can be based on this order. Each tree node Y represents a unique rule $R:P \to C_i$. A tree node tree Y' that represents rule $P' \to C_j$ is a child node of Y, if:

1. $P \subset P'$
2. $P < P'$
3. no other rule $P'' \to C_k$ exists so that $P \subset P'' \subset P'$ and $P < P'' < P'$.

Figures 8A, 8B:
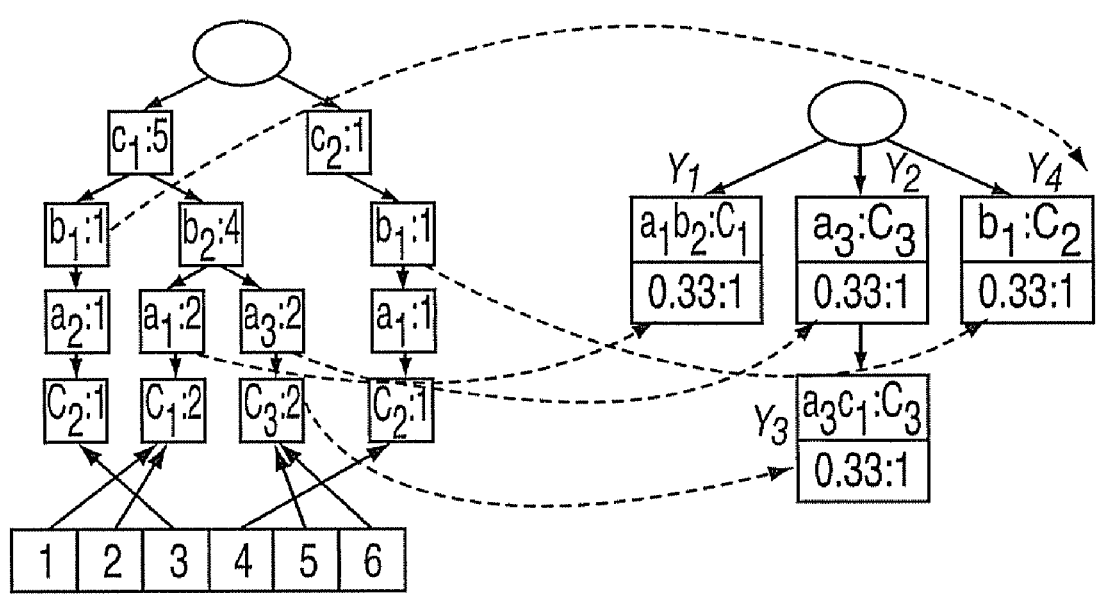
FIG. 8A and FIG. 8B, collectively referred to herein as FIG. 8, depict an exemplary REC-tree and RS-tree.

A tree node Y includes values for the support sup(R) and the confidence conf(R) for each rule R it represents. An exemplary RS-tree is shown in FIG. 8B. In FIG. 8B, tree node $Y_1$ represents rule $(a_1; b_2) \to C_1$ whose support and confidence are 0.33 and 1 respectively. Tree node $Y_3$ is the child of $Y_2$ since $\{a_3\} \subset \{a_3; c_1\}$ and $\{a_3\} < \{a_3; c_1\}$.

The second data structure is referred to as a "REC-tree." An exemplary REC-tree is depicted in FIG. 8A. In the REC-tree, each record r may be regarded as a sequence, $<v_d; \ldots; v_1; C_i>$, where $v_i$ represents a value for the attribute $A_i$, and C represents the class label for the record r. The record r is inserted into the REC-tree structure using a sequence representation $<v_d; \ldots; v_1; C_i v_1; C_{ii}>$. A path from any internal tree node Y to the root node $Y_r$ represents a unique postfix $\{A_i = v_i; A_r+1 = v_r+1; \ldots; A_d = V_d\}$.

1. tree node Y satisfies $p_1$
2. the postfix that starts at tree node Y contains the pattern $p_1 \hat{} p_2 \hat{} \ldots \hat{} p_k$ Intuitively, the tree node Y represents a projection of a record r, and it points to all rules whose pattern r satisfies. For each record r that moves into the current window $W_i$, the support and the confidence of the rules matches the tree node Y are updated. The rule pointers speed up this process.

An exemplary REC-tree is shown in FIG. 8A. Referring to FIG. 8A, the record $\{a_2; b_1; c_1: C_1\}$ is stored on the left-most path. The tree node $(b_1: 1)$ in the path points to rule $b_1 \to C_2$ in the RS-tree. In this example, the REC-tree is associated with an array of record ids [i; . . . ; i+w−1]. Each record id points to a leaf node that represents that record r. When a new record r arrives, the record r is inserted into the REC-tree and also inserted into a record id (rid) array. The record id array provides for efficient access to any record r in the window W.

Accordingly, the REC-tree is used to update the dynamic rule classifier. As an illustration, assume the current window is initially denoted as $W_i$. When a new record $r_{i+w}$ arrives, the current window advances (and is now denoted as $W_{i+1}$) and a new classifier $C_{i+1}$ is derived. First the record $r_{i+w}$ is inserted into the REC-tree. The support and the confidence of the rules pointed to by the tree nodes Y are updated as follows:

$$sup_{i+1}(R) = \frac{sup_i(R) * w + 1}{w} \quad (4)$$

$$conf_{i+1}(R) = \begin{cases} \frac{conf_i(R) * sup_i(R) + 1}{sup_i(R) + 1} : C_i = C_j \\ \frac{conf_i(R) * sup_i(R)}{sup_i(R) + 1} : C_i \neq C_j \end{cases} \quad (5)$$

$sup_i(R)$ and $conf_i(R)$ represent the old support and the old confidence values for R, and $sup_{i+1}(R)$ and $conf_{i+1}(R)$ represent the new values; $C_i$ represents the class label of $r_{i+w}$ and $C_j$ is the class label for the record R. The insertion of $r_{i+w}$ can create new tree nodes Y, in which case the counter is set to 1. Moreover, new rule pointers, if necessary, are added to this tree node Y. To find which rules are matched a postfix, the RS-tree is scanned. Assuming a new tree node Y represents $A_i = v$. Since the RS-tree is a prefix tree, only the subtrees whose root's rule has $A_i = v$ as its pattern's first predicate need be scanned.

The record $r_i$ from is deleted from the REC-tree and the matching rules are updated. The counters corresponding to the tree nodes involved are decremented appropriately. Typically, when the counter for each tree node Y becomes 0, the counter is not deleted from the REC-tree immediately. Since the counter contains the information regarding the rules to which the counter points, the information can be used later when a record r with the same postfix arrives. Typically, when the number of tree nodes in REC-tree exceeds a predetermined threshold, the tree nodes having counters with zero (0) values are deleted.

In summary, the algorithm typically includes two phases. In a first phase, building of the dynamic rule classifier takes place. The first w records r are used to develop valid rules for a first window $W_1$. Using the valid rules, the RS-tree and the REC-tree are constructed. In a second phase, an update phase, updating of the model takes place.

In the update phase, an exemplary algorithm provides that when an entrance record $r_{i+w}$ arrives, the record $r_{i+w}$ is inserted into the REC-tree. The support and the confidence of the rules matched by the record $r_{i+w}$ are updated. Subsequently, an exit record $r_i$ is deleted and the rules matched according to the exit record $r_i$ are updated. For every w records, the misclassified records for $N_{i+1; j}$ and for $N_{kj}$ are compared for each class label $C_j$. If, for some j, the difference exceeds minWR, new rules are mined using the algorithm MINERULE, or an equivalent thereto.

Aspects of the exemplary algorithm referred to as "UPDATE" are now presented.

---

Algorithm UPDATE

Input: $r_i$ : record that moves out of the window;
Input: $r_{i+w}$ : record that moves into the window;
1.    let Y be the tree-node that represents $r_i$ in the REC-tree;
2.    for each tree-node y from Y to the root tree-node,
3.        decrement y's counter by 1;
4.        update the rules pointed to by y;
5.    for m ← d to 1
6.        if $A_m = v_m$ already exists in REC-tree
7.           then   increment its counter by 1;
8.                       update the rules' support and confidence;
9.           else   create a new tree-node with counter = 1;
10.                   scan RS-tree and add rule pointers if necessary;
11.   add a new entry in record id array;
12.   update $Y_{i+1,j}$ and $L_{i+1,j}$;
13.   if (i + 1) mod(w)=0 and $(Y_{i+1,j} - Y_{kj}) \mu$ minWR
14.   then apply MINERULE

---

As a validation of the dynamic rule classifier, certain tests were completed. Testing was conducted using a personal computer with a 1.7 GHz processing unit and 256 megabytes of main memory. A synthetic dataset (a hyperplane dataset) was used, as well as a dataset including actual data. In order to simulate a data stream 100, records r were chosen randomly from the dataset, and after every 50,000 records the values of the sampled records were changed.

Figure 9:
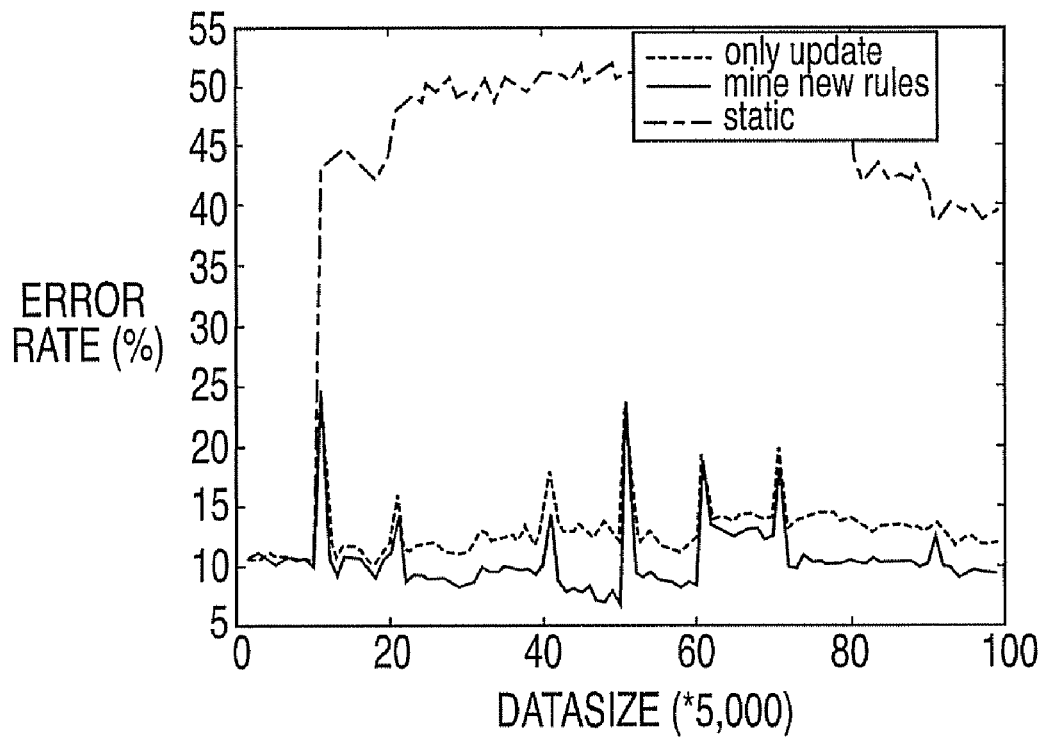
FIG. 9 depicts an effect of model updating.

Referring to FIG. 9, error rates for various models are depicted. In order to produce the comparison depicted in FIG. 9, a data stream 100 was data mined using a static model, a model with only one update and the dynamic rule classifier as disclosed herein. FIG. 9 shows that concept drift can be detected by measuring accuracy, and that mining new rules can greatly improve accuracy of the data mining.

Figure 10:
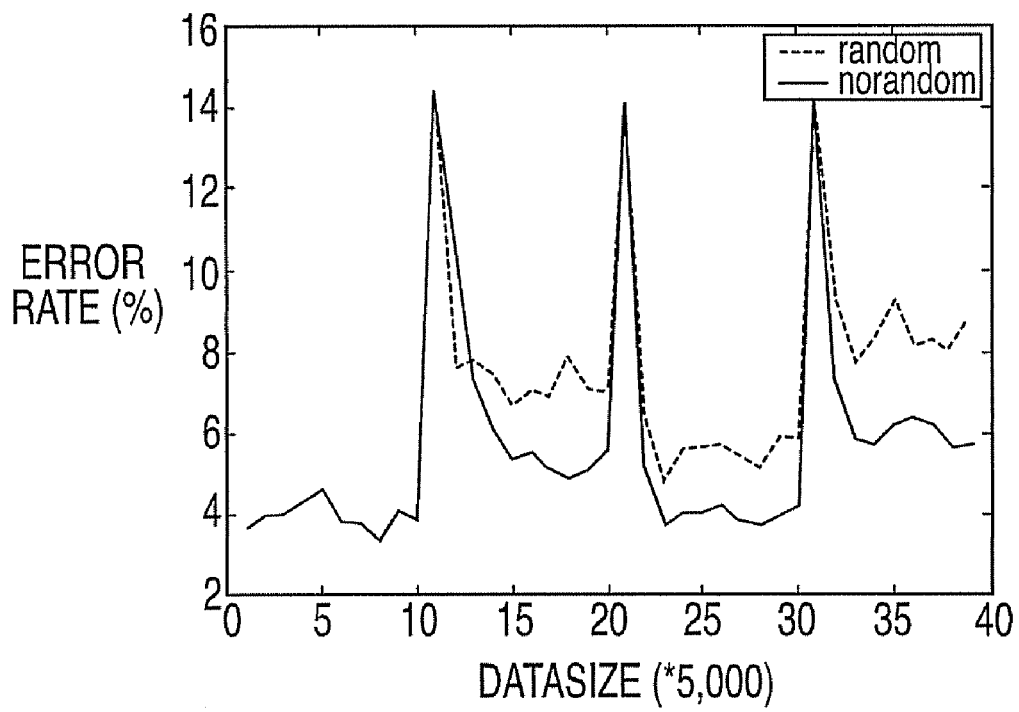
FIG. 10 indicates validity of choosing literal patterns.

In FIG. 10, error rate is shown as being reduced by using most frequently occurring predicates $p_i$ in the misclassified records $N_{ij}$ to construct the candidate rule set, and that the new rules can effectively represent the new concept.

Figure 11A:
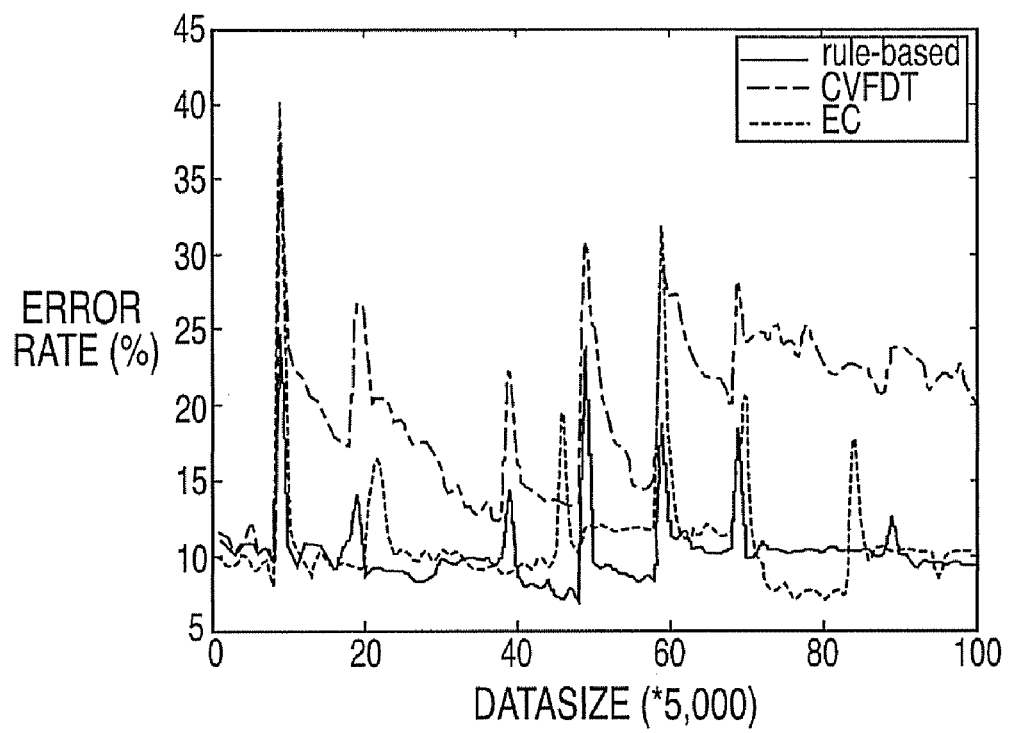
FIG. 11A and FIG. 11B, collectively referred to herein as FIG. 11, provides comparative data with prior art techniques for a synthetic data set.
Figure 11B:
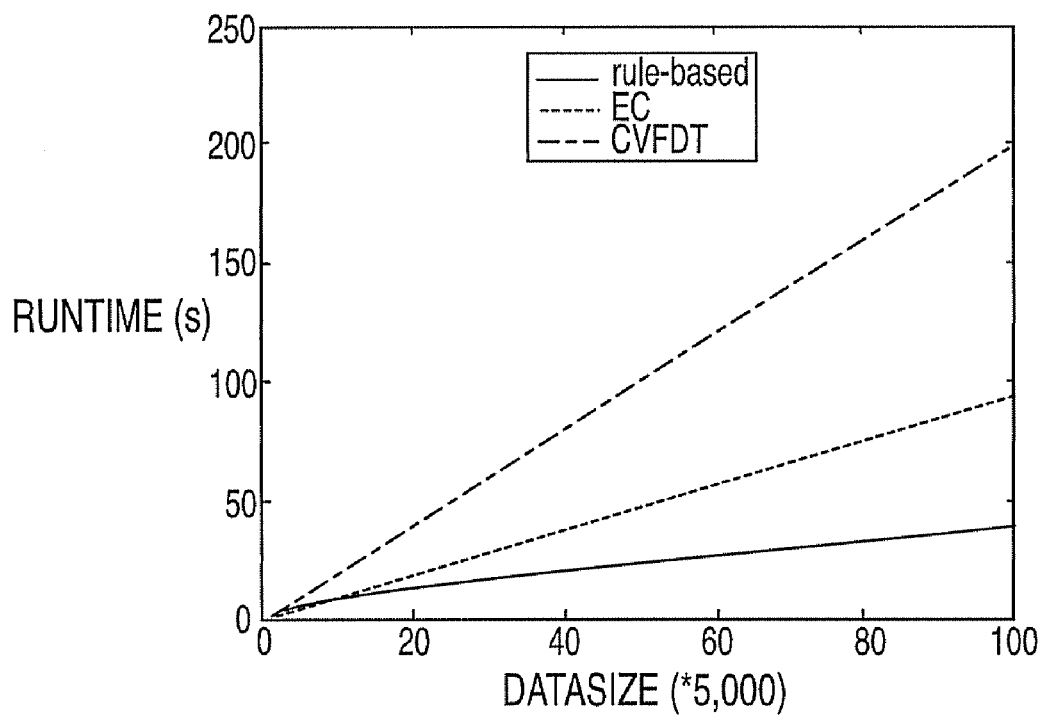
Figure 12A:
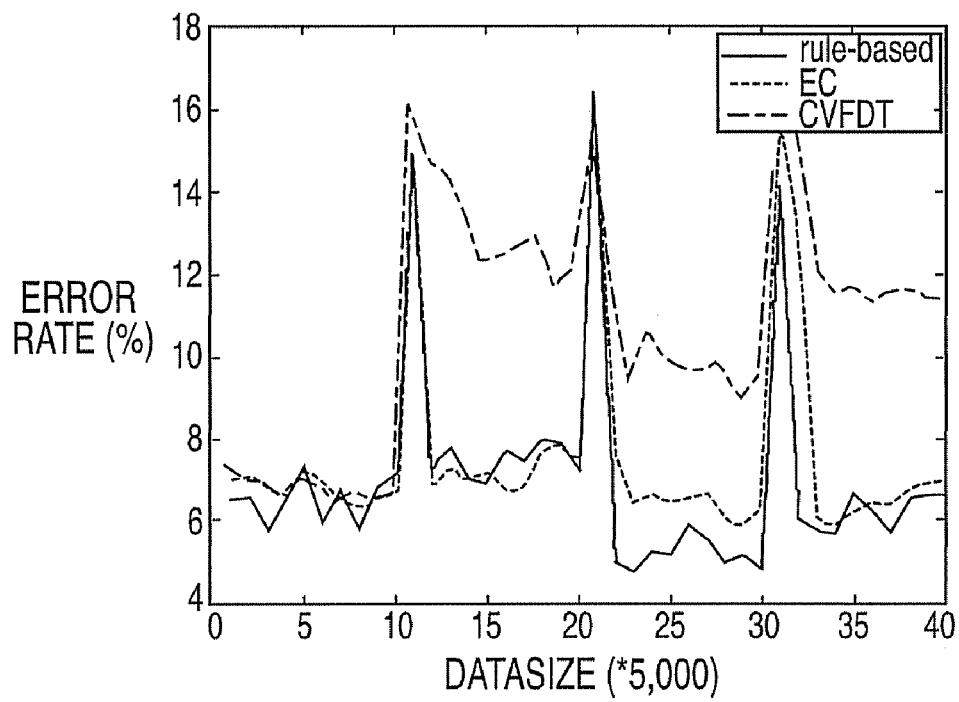
FIG. 12A and FIG. 12B, collectively referred to herein as FIG. 12, provides comparative data with prior art techniques for an actual data set; and, FIG. 13 depicts aspects and relationships of an exemplary model and components thereof.
Figure 12B:
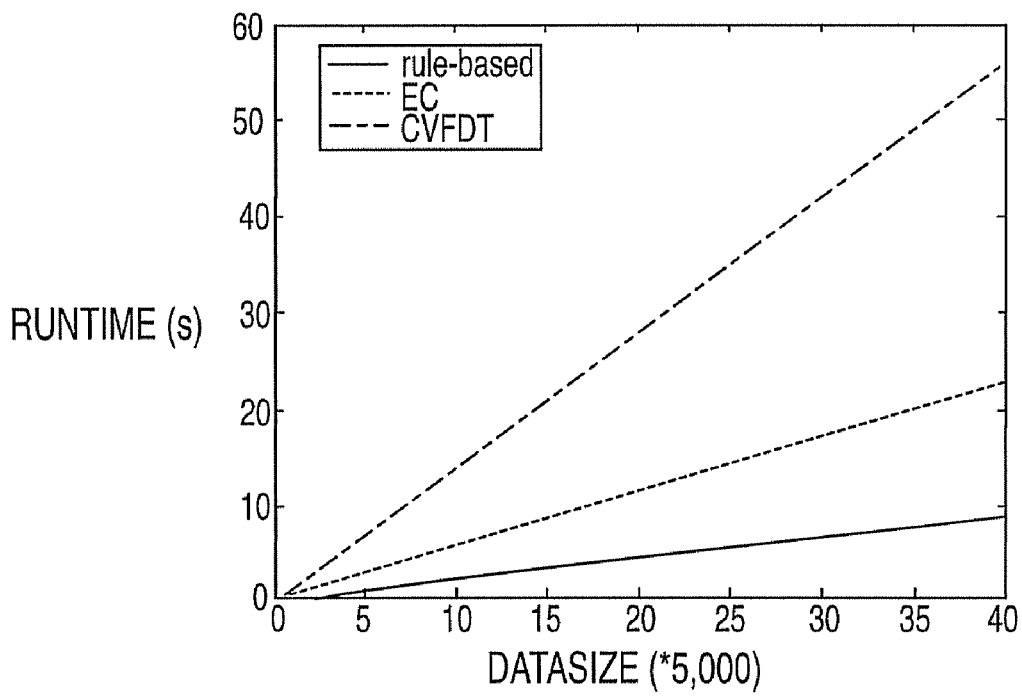

Referring to FIG. 11A and FIG. 11B, collectively referred to as FIG. 11, accuracy and efficiency for data mining a synthetic dataset using various techniques are compared. In FIG. 11, the comparison provides for distinction between the performance of the ensemble classifier, the CVFDT approach and the dynamic rule classifier. The accuracy of the dynamic rule classifier is higher than that of the CVFDT, and similar to that of the ensemble classifier. Notably, the runtime of the dynamic rule classifier was less that the other two methods. In FIG. 12A and FIG. 12B, collectively referred to as FIG. 12, use of actual data is shown to have resulted in performance similar to the synthetic data set.

Figure 13:
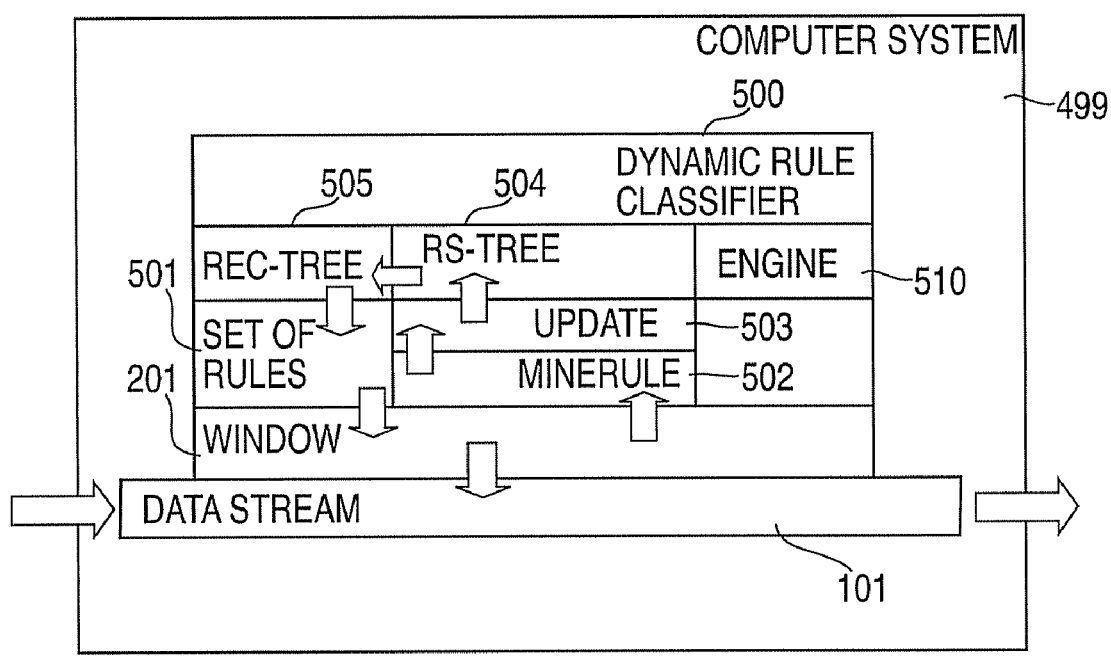

Referring to FIG. 13, a summary of aspects and relationships of exemplary embodiments of the dynamic rule classifier are shown. In FIG. 13, the dynamic rule classifier 500 is implemented by use of a computer system 499. The computer system 499 includes typical components such as at least one each of a processor, a storage, a user interface, a memory and other components as are known in the art.

The data stream 101 is viewed by the window 201 (i.e., the current window $W_i$). The window 201 employs rules from the set of rules 501 and tests the data for classification. When the misclassified records $N_{ij}$ exceed a maximum defined tolerance minWR, the algorithm MINERULE 502 identifies adjustments for the set of rules 501. The adjustments are logged by the algorithm UPDATE 503 which updates the RS-tree 504 and further updates the REC-tree 505, which feeds the set of rules 501.

In typical embodiments, the dynamic rule classifier 500 includes a model engine 510. The engine 510 provides for coordination of the operation of the dynamic rule classifier 500. For example, and among other things, the engine 510 typically invokes the algorithm MINERULE 502 when required.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for classifying data from a data stream comprising at least one drifting concept, the system comprising:
   a dynamic rule classifier including:
   a window for viewing a plurality of records of the data stream;
   a plurality of rules wherein each rule is derived from the plurality of records appearing in the window;
   at least one data tree for maintaining the plurality of rules; and, an engine for evaluating the plurality of records against the plurality of rules, detecting a concept drift in the data stream, invoking at least one algorithm for deriving at least one new rule and updating the plurality of rules
   wherein detecting a concept drift includes determining if a difference between the number of misclassified records $N_{ij}$ in a current window $W_i$ and the number of misclassified records $N_{kj}$ in a reference window $W_k$ reaches a user-defined threshold minWR
   wherein invoking at least one algorithm for deriving at least one new rule includes computing the number of misclassified records $N_{ij}$ in the current window $W_i$, where $$N_{ij}=N_{i-1,j}+g(r_{i+w-1}, i, j)-g(r_{i-1}, i, j)$$

where $g(r, I, j)=1$ if the true label for the record r is $C_j$ and the record r is misclassified by $C_i$ as some other class $C_x$, and $g(r, I, j) = 0$ otherwise.

2. The system as in claim 1, wherein the engine provides a class label for each of the records in the plurality of records.

3. A method using a dynamic rule classifier for mining data from a data stream having at least one drifting concept, the method comprising:
   in a dynamic rule classifier, detecting the at least one drifting concept by performing quality estimation;
   invoking at least one algorithm for deriving at least one new rule;
   wherein invoking at least one algorithm for deriving at least one new rule includes computing the number of misclassified records $N_{ij}$ in the current window $W_i$, where $$N_{ij}=N_{i-1,j}+g(r_{i+w-1}, i, j)-g(r_{i-1}, i, j)$$

where $g(r, I, j)=1$ if the true label for the record r is $C_j$ and the record r is misclassified by $C_i$ as some other class $C_x$, and $g(r, I, j) = 0$ otherwise; and,
   in an engine, deriving new components for the dynamic rule classifier when quality is below a threshold;
   wherein detecting a concept drift includes determining if a difference between the number of misclassified records $N_{ij}$ in a current window $W_i$ and the number of misclassified records $N_{kj}$ in a reference window $W_k$ reaches a user-defined threshold minWR.

4. The method of claim 3 wherein detecting the at least one drifting concept comprises:
   maintaining a set of valid dynamic rules, and
   estimating a quality of classification using the valid dynamic rules.

5. The method of claim 3, where the at least one drifting concept is detected by analyzing a number of misclassified records.

6. The method of claim 3, wherein the quality estimation is performed by tracking misclassified records from the data stream for comparison to the threshold.

7. The method of claim 3, further comprising:
providing a class label for each record of data in the data stream for assigning a concept to the record.

8. The method of claim 3, wherein deriving new components for the dynamic rule classifier comprises:
finding records of data that are misclassified by valid dynamic rules;
deriving patterns from found records; and
composing patterns to form new dynamic rules for the dynamic rule classifier.

9. The method for claim 8, where predicates are derived from the misclassified records.

10. The method for claim 8, where an algorithm is used to construct predicates to form new dynamic rules.

11. A method for classifying data from a data stream on an ongoing basis, the data stream comprising at least one drifting concept, the method comprising:
viewing a plurality of records of the data stream appearing in a window;
deriving from the plurality of records appearing in the window a plurality of rules;
in a dynamic rule classifier, classifying data in the plurality of records according to the plurality of rules;
invoking at least one algorithm for deriving at least one new rules;
wherein invoking at least one algorithm for deriving at least one new rule includes computing the number of misclassified records $N_{ij}$ in the current window $W_i$, where $$N_{ij}=N_{i-1,j}+g(r_{i+w-1}, i, j)-g(r_{i-1}, i, j)$$

where $g(r, I, j) = 1$ if the true label for the record r is $C_j$ and the record r is misclassified by $C_i$ as some other class $C_x$, and $g(r, I, j) = 0$ otherwise;
in an engine, comparing a first classification of the data to a second classification of the data to detect a concept drift; and, upon detecting the concept drift;
deriving at least one new rule to account for the concept drift and updating the plurality of rules;
wherein detecting a concept drift includes determining if a difference between the number of misclassified records $N_{ij}$ in a current window $W_i$ and the number of misclassified records $N_{kj}$ in a reference window $W_k$ reaches a user-defined threshold minWR.

12. A computer program product stored on tangible media, the product for classifying data from a data stream on an ongoing basis, the data stream comprising at least one drifting concept, and comprising instructions for:
viewing a plurality of records of the data stream appearing in a window;
deriving from the plurality of records appearing in the window a plurality of rules;
classifying data in the plurality of records according to the plurality of rules in a dynamic rule classifier;
invoking at least one algorithm for deriving at least one new rule;
wherein invoking at least one algorithm for deriving at least one new rule includes computing the number of misclassified records $N_{ij}$ in the current window $W_i$, where $$N_{ij}=N_{i-1,j}+g(r_{i+w-1}, i, j)-g(r_{i-1}, i, j)$$

where $g(r, I, g) = 1$ if the true label for the record r is $C_j$ and the record r is misclassified by $C_i$ as some other class $C_x$, and $g(r, I, j) = 0$ otherwise;
comparing a first classification of the data to a second classification of the data in an engine to detect a concept drift; and, upon detecting the concept drift;
deriving at least one new rule to account for the concept drift and updating the plurality of rules;
wherein detecting a concept drift includes determining if a difference between the number of misclassified records $N_{ij}$ in a current window $W_i$ and the number of misclassified records $N_{kj}$ in a reference window $W_k$ reaches a user-defined threshold minWR.

13. The computer program product of claim 12, wherein deriving a plurality of rules comprises:
sorting the plurality of records;
choosing a list sorted records to construct a candidate rule set;
computing a support statistic and a confidence statistic for the candidate rule set; and
adding each rule from the candidate rule set to the plurality of rules when a support value for the rule and a confidence value for the rule are greater than or equal to the support statistic and the confidence statistic, respectively.

14. The computer program product of claim 12, wherein at least one tree structure is constructed for maintaining the plurality of rules.

15. The computer program product of claim 14, wherein each node of the at least one tree structure represents a rule.

16. The computer program product of claim 12, wherein deriving at least one new rule further comprises:
comparing the first classification of the data to the second classification of the data to detect concept drift, and, upon detecting the concept drift;
deriving a plurality of rules.

* * * * *